United States Patent
Alcorn et al.

(10) Patent No.: US 7,788,207 B2
(45) Date of Patent: Aug. 31, 2010

(54) SYSTEMS AND METHODS FOR INTEGRATING EDUCATIONAL SOFTWARE SYSTEMS

(75) Inventors: Robert L. Alcorn, Arlington, VA (US); Deborah A. Everhart, Washington, DC (US)

(73) Assignee: Blackboard Inc., Washington, DC (US)

( * ) Notice: Subject to any disclaimer, the term of this patent is extended or adjusted under 35 U.S.C. 154(b) by 600 days.

(21) Appl. No.: 11/822,653

(22) Filed: Jul. 9, 2007

(65) Prior Publication Data
US 2009/0018986 A1    Jan. 15, 2009

(51) Int. Cl.
G06F 17/00 (2006.01)
G06N 5/02 (2006.01)

(52) U.S. Cl. ...................................................... 706/49
(58) Field of Classification Search .................... 706/49
See application file for complete search history.

(56) References Cited

U.S. PATENT DOCUMENTS

| | | | |
|---|---|---|---|
| 5,943,423 A | 8/1999 | Muftic | |
| 6,368,110 B1 | 4/2002 | Koenecke et al. | |
| 6,484,199 B2 | 11/2002 | Eyal | |
| 6,652,287 B1 | 11/2003 | Strub et al. | |
| 6,988,138 B1 * | 1/2006 | Alcorn et al. | 709/225 |
| 6,998,138 B2 | 2/2006 | Chew et al. | |
| 7,493,396 B2 * | 2/2009 | Alcorn et al. | 709/225 |
| 7,558,853 B2 * | 7/2009 | Alcorn et al. | 709/225 |
| 7,657,782 B2 * | 2/2010 | Das et al. | 714/6 |
| 2002/0087560 A1 | 7/2002 | Bardwell | |
| 2006/0259351 A1 | 11/2006 | Yaskin et al. | |
| 2007/0016650 A1 * | 1/2007 | Gilbert et al. | 709/207 |

OTHER PUBLICATIONS

Geoff Collier et al., "IMS Enterprise Information Model," IMS Global Learning Consortium, Inc., Dec. 21, 1999 (31 pages).
Colin Smythe, "IMS Enterprise Services Specification: Overview," IMS Global Learning Consortium, Inc., 2004 (24 pages).
"IMS Enterprise Services Common Data Definitions," IMS Global Learning Consortium, Inc., Jun. 11, 2004 (35 pages).
"IMS Enterprise Services Conformance Specification," IMS Global Learning Consortium, Inc., Jun. 11, 2004 (16 pages).
"IMS Enterprise Services Specification," IMS Global Learning Consortium, Inc., Jun. 11, 2004 (21 pages).
"IMS Enterprise Services Core Use Case Descriptions," IMS Global Learning Consortium, Inc., Jun. 11, 2004 (42 pages).
"IMS Group Management Services WSDL Binding," IMS Global Learning Consortium, Inc., Jun. 11, 2004 (29 pages).
"IMS Person Management Services WSDL Binding," IMS Global Learning Consortium, Inc., Jun. 11, 2004 (29 pages).
"IMS Person Management Services Information Model," IMS Global Learning Consortium, Inc., Jun. 11, 2004 (39 pages).

(Continued)

*Primary Examiner*—Michael Holmes
(74) *Attorney, Agent, or Firm*—McDermott Will & Emery LLP

(57) ABSTRACT

Systems and methods are provided for integrating educational software. In one implementation, a first server receives an identifier of a second server that provides at least one source educational course. A second server receives metadata for the at least one source educational course and stores the metadata.

78 Claims, 14 Drawing Sheets

OTHER PUBLICATIONS

"IMS Membership Management Services WSDL Binding," IMS Global Learning Consortium, Inc., Jun. 11, 2004 (31 pages).
"IMS Group Management Services Information Model," IMS Global Learning Consortium, Inc., Jun. 11, 2004 (41 pages).
"IMS Membership Management Services Information Model," IMS Global Learning Consortium, Inc., Jun. 11, 2004 (40 pages).
"IMS Enterprise Services Best Practice and Implementation Guide," IMS Global Learning Consortium, Inc., Jun. 11, 2004 (86 pages).
Notification of Transmittal of the International Search Report and the Written Opinion of the International Searching Authority for International Application No. PCT/US 08/04542, mailed Aug. 15, 2008 (12 pages).
Sneed, Harry M., "Encapsulating Legacy Software for Use in Client/Server Systems", IEEE, (1996), pp. 104-119.
Lupu, Ana-Ramona, et al., "Integrated Information Systems in Higher Education", WSEAS Transactions on Computers, (May 2008), pp. 473-482, Iss. 5, vol. 7.
Ahern, Terence, et al., "Open Protocols for Web-based Educational Materials", Frontiers in Education, (2001), pp. 1-31.

* cited by examiner

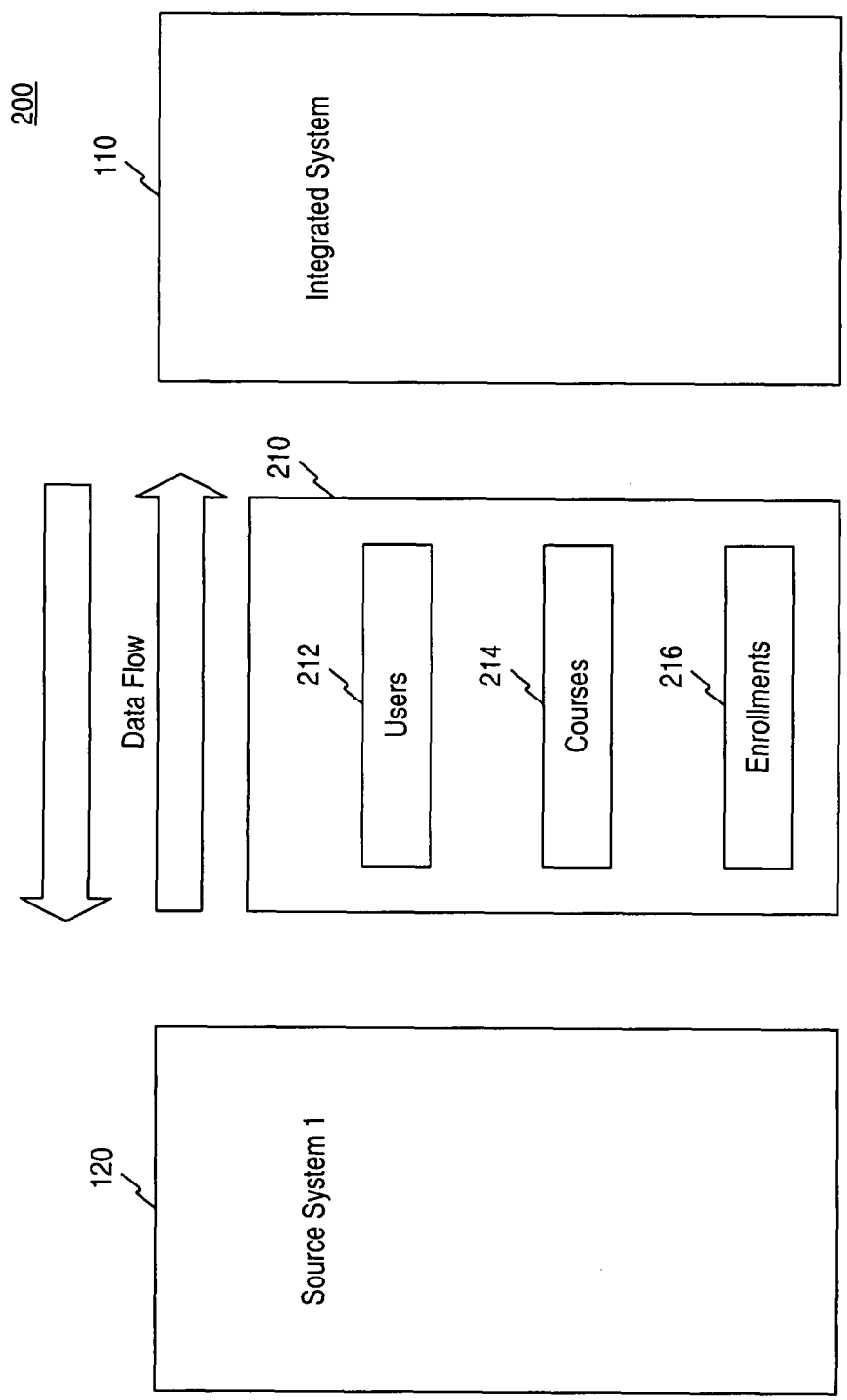

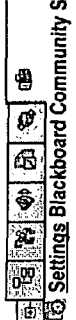

[ My Institution | Courses | Community | Services | System Admin ]

② Data Source Properties

The Data Source Key identifies the data from this integration. The Data source cannot be modified after the integration has been added.

* Data Source Key [          ]
  Data Source Description [          ]

③ Settings

Import Settings from File [          ] [Browse]
Browse to select a file to import settings, then click Import Settings below. Settings may also be entered manually.
[Import Settings]

* Learning Environment Type ○ Blackboard Learning System - Vista Enterprise License ○ Blackboard Learning System - CE (Release 6) ○ Blackboard Learning System - CE (Release 4)
* Learning Environment ID [          ]
* SSO Settings [          ]

* Authentication Settings [          ]

④ Conflict Resolution

* Use Conflict Resolution ○ Never ● Always ○ Only on Conflicts
  Never: Fail for records that have conflicting IDs and do not add or update the record.
  Always: Use conflict resolution regardless of whether or not there is a conflict.
  Only on Conflicts: Use conflict resolution only when there is a conflict.
* Resolution Logic ● Prefix ○ Suffix
  String [          ]
  This text can be alphanumeric and must be unique for each Learning Environment Integration (created in a case-insensitive fashion)

⑤ Submit

Click Submit to finish. Click Cancel to quit.

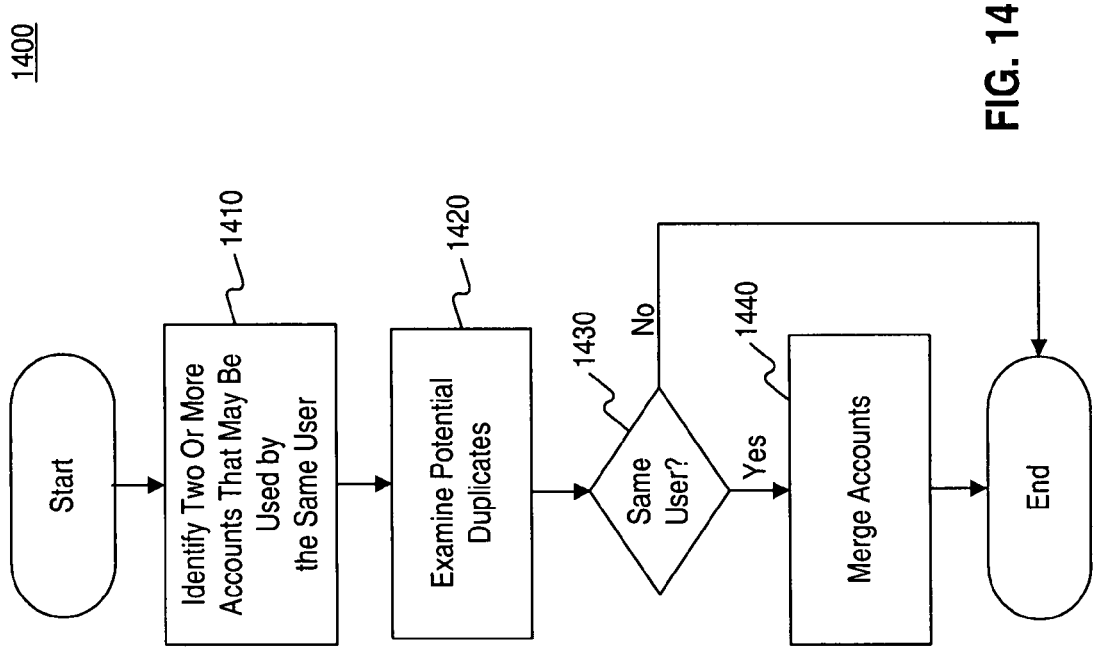

SYSTEMS AND METHODS FOR INTEGRATING EDUCATIONAL SOFTWARE SYSTEMS

BACKGROUND

I. Technical Field

The present invention generally relates to the field of educational software. More particularly, the invention relates to computerized systems and methods for integrating educational software associated with one or more source systems.

II. Background Information

Electronic learning (or e-learning) typically refers to facilitating and enhancing learning through the use of computers. Electronic learning can include a variety of activities, such as video conferencing and/or web casting of course instruction, online storage of course materials, online storage of student portfolios, online-based course and/or testing materials, discussion boards, e-mail, blogs, and text chat. In recent years, electronic learning has grown rapidly as educational institutions have used it to supplement classroom education. For example, a traditional course may have an online or electronic counterpart in which students may access course materials, interact with other classmates, and submit questions to a teacher, all via computerized systems. Furthermore, educational institutions offer courses that are only available through electronic learning. These courses exist solely in an electronic realm where students attend and complete a course via a computer of their choosing.

To attend an electronic learning course, a student is typically provided with credentials (e.g., a username and password) for accessing a computerized system, such as a website. Once authenticated, the student is able to, for example, view a webcast of a course. During or after the webcast, the student may access course materials or participate in further online activities (e.g., discussion boards, e-mail, blogs, and text chat). Furthermore, administrator users may access the system in order to create and/or modify course enrollments, for example. Teacher users may also access the system in order to, for example, create and/or modify course materials and update grades. An example of a system that provides education online, including the ability of users to have multiple roles in multiple courses, is disclosed in U.S. Pat. No. 6,988,138 B1, issued Jan. 17, 2006, entitled "Internet-Based Education Support System and Methods," the disclosure of which is incorporated herein by reference.

Students may also be enrolled in multiple electronic learning courses. In order to access those courses, the student may need to navigate using, for example, a web browser, to other websites. For example, the student may need to navigate to a website that only provides access to one course. The student may need to navigate to other websites to access other courses. Each website may require the student to submit a different set of credentials for authentication. Furthermore, each website may separately store course materials and provide access to online activities, which may be specific to the courses accessed from each website. These websites typically do not communicate or share information and, consequently, are unable to determine that a student is enrolled in other courses.

Systems also present significant drawbacks for other users, such as administrators and teachers. For example, administrators often must access separate systems and learn separate methods for setting up and managing courses and users. For example, an administrator's responsibilities may include updating course enrollments for courses that are provided by different systems. Consequently, the administrator may need to access each system and use functionality that is specific to each system to make the changes. Similarly, teachers may need to access separate systems and learn separate methods to create, modify, and manage course materials and grades.

As is evident from the foregoing discussion, as electronic learning grows, users, including students, teachers, and administrators, frequently must access a variety of systems, maintain multiple sets of credentials, and navigate to separate websites for each course. With such configurations, students do not receive an electronic learning experience in which they are part of a community. Accordingly, disparate electronic learning systems do not provide students with a unified, central electronic learning experience. Furthermore, such configurations present drawbacks to teachers and administrators because they are unable to access one system to perform their tasks. Accordingly, a unified, central electronic learning experience would also benefit teachers and administrators by providing access to all courses and materials from a central aggregating site. Accordingly, there is a need for systems and methods for integrating disparate educational software systems.

SUMMARY

Consistent with an embodiment of the present invention, a computer-implemented method is provided for integrating educational software. The method may comprise receiving, by a first server, an identifier of a second server that provides at least one source educational course. The method may further comprise receiving, from the second server, metadata for the at least one source educational course and storing the metadata for the at least one source educational course.

Consistent with another embodiment of the present invention, a computer-implemented method is provided for integrating educational software. The method may comprise receiving, by a host server, a plurality of identifiers. Each of the plurality of identifiers may correspond to a source server that provides a source educational course. The method may further comprise receiving, from the source servers, metadata for the source educational courses and storing the metadata in a storage device coupled to the host server.

Consistent with another embodiment of the present invention, a computer-implemented method is provided for enabling access to educational software. The method may comprise receiving, at a first server, a selection of an educational course and determining, by the first server, a storage location of the educational course. The storage location may reside on a second server. The method may further comprise transmitting, by the first server, a query to the second server and receiving, by the first server, an address of the educational course that is stored on the second server. The method may enable the first server to provide access to the educational course.

Consistent with another embodiment of the present invention, a computer-implemented method is provided for enabling access to educational software. The method may comprise receiving, at a first server, a selection of an educational course and determining, by the first server, a storage location of the educational course. The storage location may reside on a second server. The method may further comprise retrieving, from a storage device coupled to the first server, an address of the educational course that is stored on the second server and enabling the first server to provide access to the educational course.

Consistent with another embodiment of the present invention, a computer-implemented method is provided for integrating educational software. The method may comprise receiving, by a first server hosting at least one native educational course, an identifier of a second server that provides at least one source educational course. The method may receive, from the second server, metadata for the at least one source educational course. The metadata may include a role of a user of the at least one source educational course. The method may further store the metadata for the at least one source educational course in a storage device coupled to the first server, provide access, from the first server, to the at least one source educational course, and determine, by the first server, access rights of the user based on the role. The access rights may specify whether the user can access the least one source educational course and the at least one native educational course.

Consistent with another embodiment of the present invention, a computer-implemented method is provided for integrating educational software. The method may comprise receiving, by a first server, role data for at least one user of at least one source educational course that is provided by a second server, storing the role data in a storage device coupled to the first server, and determining, by the first server, access rights of the at least one user based on the role data. The access rights may specify whether the user can access the least one source educational course.

Consistent with another embodiment of the present invention, a computerized system is provided for integrating educational software. The system may comprise a storage device and a first server coupled to the storage device. The first server may receive an identifier of a second server that provides at least one source educational course; receive, from the second server, metadata for the at least one source educational course; and store the metadata for the at least one source educational course in the storage device.

Consistent with another embodiment of the present invention, a computerized system is provided for enabling access to educational software. The system may comprise a storage device and a first server coupled to the storage device. The first server may receive a selection of an educational course and determine a storage location of the educational course. The storage location may reside on a second server. The first server may transmit a query to the second server and receive an address of the educational course that is stored on the second server. The first server may further provide access to the educational course.

Consistent with yet another embodiment of the present invention, a computer-implemented method is provided for automatically creating a domain during a system integration of educational software. The method may comprise receiving, by a first server, a source identifier of a second server. At least one source educational course provided by the second server may be integrated into the first server. The method may further comprise automatically creating the domain. The domain may include metadata for the at least one source educational course. The method may store the domain in a storage device coupled to the first server.

Consistent with yet another embodiment of the present invention, a computer-implemented method is provided for creating a domain. The method may comprise receiving, by a first server, a selection of entities stored in a storage device coupled to the first server. The method may further comprise creating the domain for the selected entities. At least one of the selected entities may a course and the domain may include metadata for the course, users associated with the course, and role data specifying a role of each of the users in the course. The method may store the domain in a storage device coupled to the first server.

Consistent with yet another embodiment of the present invention, a computer-implemented method is provided for creating, or specifying data reflecting, a domain. The method may comprise receiving, by a first server, a selection of entities stored in a storage device coupled to the first server. The method may comprise creating the domain, wherein the domain includes metadata for the entities. The method may further comprise storing the domain in the storage device coupled to the first server.

Consistent with other embodiments of the present invention, one or more computer-readable mediums are provided that store program instructions for implementing one or more of the above-described methods.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 2 is an exemplary diagram showing data flow in the system of FIG. 1, consistent with a disclosed embodiment;

FIG. 3 is an exemplary user interface for integrating a source system, consistent with a disclosed embodiment;

FIG. 4 is another exemplary user interface for integrating a source system, consistent with a disclosed embodiment;

FIG. 9 is an exemplary user interface for an administrator to search and view user profiles, consistent with a disclosed embodiment;

FIG. 10 is an exemplary user interface for an administrator to edit a user profile, consistent with a disclosed embodiment;

FIG. 14 is an exemplary flow diagram of a method for merging user accounts in an integrated system, consistent with a disclosed embodiment.

DETAILED DESCRIPTION

Figure 1:
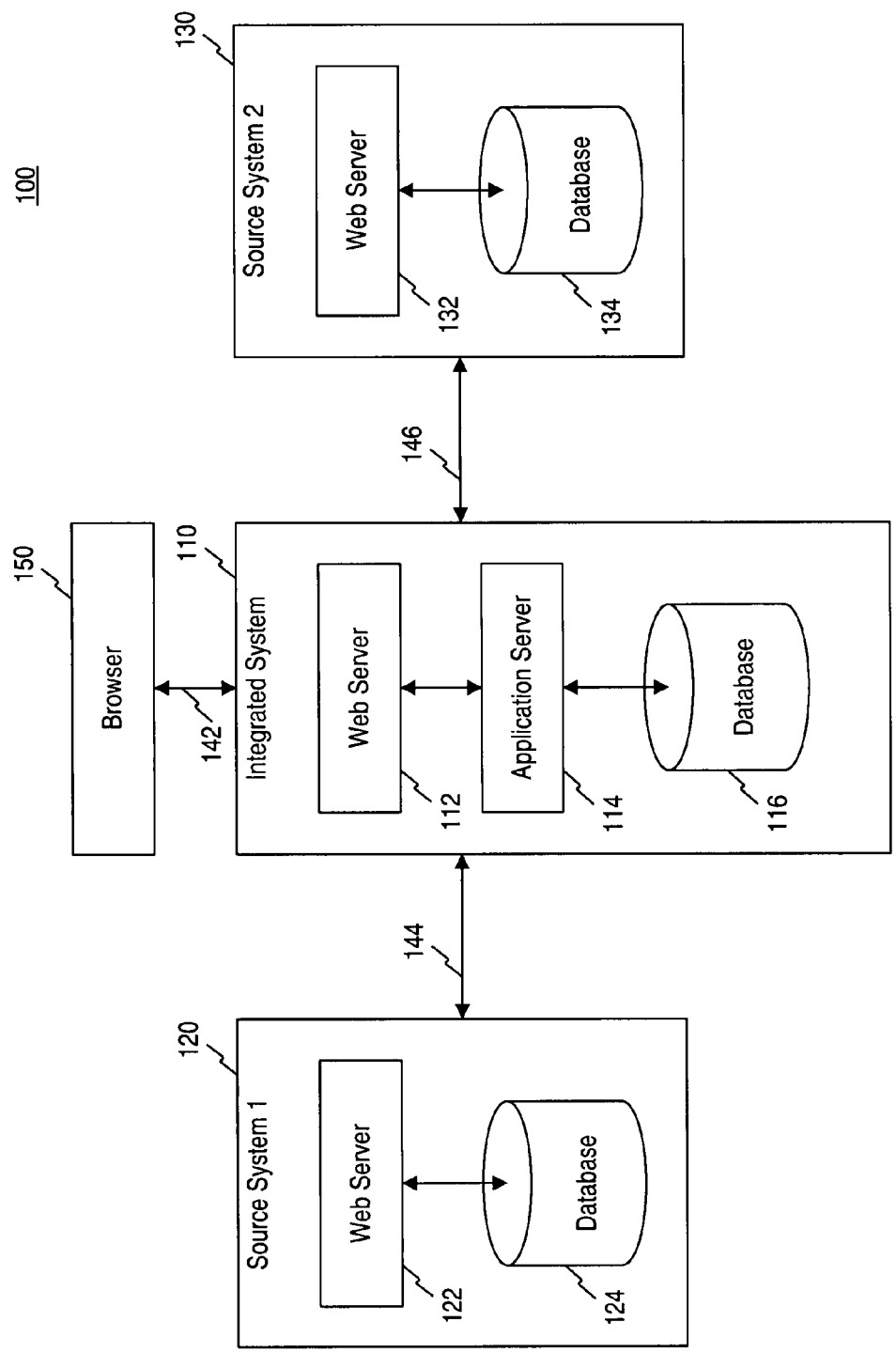
FIG. 1 is an exemplary system for integrating educational software modules, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods according to disclosed embodiments provide for integration of educational software modules from one or more source systems into an integrated or unified learning management system. A learning management system (LMS) is a software-based system that enables management and delivery of online or electronic educational content and activities to users. Functionality provided by a learning management system may include registering users, delivering content and activities, such as providing access to course materials and testing, discussion boards, blogs, RSS (Really Simple Syndication) feeds, emails, etc. Furthermore, a learning management system may provide tools for evaluating student performance. Learning management systems are typically based on various development platforms (e.g., Java, XML, Microsoft.Net framework) and may provide access to users via the Internet. Users may include students, teachers, and administrators. For example, a portal may allow a user to supply credentials (e.g., a username and password) and, after being authenticated, the user may navigate to courses, course materials, and other online functionality.

Furthermore, a learning management system often provides access control, provisioning of e-learning content, communication tools, and administration of user groups. For example, a learning management system may provide functionality for teachers to manage courses and course materials, track student progress, provide content pages, discussion forums, chat, and create and/or modify online testing. For example, teachers may participate in discussions, conduct instruction, post and/or modify course materials, and maintain a grade book. Administrators may modify courses, course materials, course enrollments, and user accounts. Student users may access educational content, activities, and store course work.

In this application, the term "source system" refers to a learning management system or software program that provides an electronic learning course. Examples of source systems include WebCT products, Blackboard Vista (a course management system), and Blackboard Campus Edition (a course management system). Source systems may also include other products provided by, for example, Blackboard Inc., other providers, or open source systems. The term "integrating" refers to incorporating, copying, or including data for courses, users, and/or enrollments from a source system to a unified system. In this application, the term "integrated system" refers to a learning management system in which educational software is being integrated from one or more source systems. Data for a course may include user data, role data specifying roles of the users in a particular course (or activity), enrollment data, other data concerning students (e.g., student groups), or other course data (e.g. announcements or grades).

During an integration process, software that is used by the course remains on a source system and may not be copied to the integrated system. That is, the software that provides the course (lectures, course materials, etc.) remains hosted by the source system. Typically data that is associated with the course may be stored in the source system. Alternatively, data that is subsequently generated by a course, such as grades, may be stored in the integrated system. After integration, the integrated data becomes available through the integrated system, but the course software itself is still hosted by the source system. Furthermore, the integrated system may provide its own course (i.e., a native course) that is fully hosted and provided (e.g., by an institution, application service provider, or other entity) from the integrated system. An example of an integrated system is the Blackboard Academic Suite, available from Blackboard Inc. Users of the Blackboard Academic Suite may, for example, access courses that are provided by a source system through the Blackboard Academic Suite. To the users, the integration provides a seamless educational experience, allowing the users to access courses provided by the source system through a central learning management system. Thus, to the user, it appears that they are accessing (and staying within) the integrated system, when it fact the integrated system provides access to and displays course software and content directly from a source system.

In one embodiment, the integrated system may provide a central educational site for users to access courses, materials, and other functionality. As a result, users are able to enjoy an educational experience in which they are able to attend all courses through one site, similar to attending a particular institution (e.g., a university). Furthermore, systems and methods disclosed herein may provide a common course and enrollment infrastructure for the management of courses/sections for both courses from the integrated system and source systems. As a result, systems and methods disclosed herein may provide a consolidated course list and/or course catalog that includes courses from both the integrated system and one or more source systems. Users, including students, teachers, and administrators, may benefit from such consolidation. For example, administrators may access the integrated system to set up and manage courses and users. Moreover, the integrated system may provide shared resources (content, user tools, etc.) for courses provided by multiple source systems. Systems and methods consistent with the present invention may further provide consistent security protections for managing and protecting user privacy and user data across both courses from the integrated system and source systems. Furthermore, systems and methods disclosed herein may merge multiple user IDs at an institution in order to provide the same user experience for multiple IDs across the integrated system.

Users of the integrated system may access a consolidated course catalog, which may provide a listing of courses of one or more source systems and/or the integrated system. The course catalog may, therefore, allow users to access courses regardless of whether the courses are provided by a source system or an integrated system. For example, consistent with one embodiment, the integrated system can be a stand-alone integrated system that provides courses from one or more source systems. In another embodiment, the integrated system may provide its own courses (i.e., native courses) in addition to courses from one or more source systems.

In one embodiment, an integrated system may include a course management system, a community and portal system, and a content management system. A course management system may provide tools enabling teachers to generate course materials and content and may facilitate course instruction between teachers and students. A community and portal system may provide students and teachers with tools for interacting, such as discussion boards. A content management system may provide management of electronic files (e.g., electronic documents, images, audio, video, and web content) that teachers and/or students may create, modify, and share. All of these activities may be related to courses from source systems and/or the integrated system.

Furthermore, the integrated system may include an evaluation system, which provides functionality for performing assessment of the effectiveness of an institution. Such functionality may be particularly useful in determining whether an institution should retain its accreditation. Alternatively, the evaluation system may reside outside of the integrated system. For example, the evaluation system may be provided by the same party as the integrated system or by a third party. An example of an evaluation system is disclosed in U.S. Patent Application Publication No. 2006/0259351 A1, published Nov. 16, 2006, entitled "Method and System for Assessment within a Multi-Level Organization," the disclosure of which is incorporated herein by reference. Due to the integration of courses from source systems to an integrated system, the integrated system may collect grades and other learning records and/or data from multiple source systems. Accordingly, from the integrated system, one may perform assessments of users, courses, departments, and an institution regardless of their origin.

Consistent with embodiments of the present invention, users (e.g., students, teachers, and administrators) of a source system and/or integrated system may have one or more roles. As the term is used herein, a "role" may indicate an access level of a user in a particular course or activity. For example, a role of a user may indicate whether the user is a student, teacher, alumni, or an administrator for a particular course or activity. An integrated system may use the roles of a user to determine what the user has access to in the context of a particular course or activity. When a course is integrated from a source system to an integrated system, data specifying the role of the users who are associated with the course and each user's role within that course may be included in the data received by the integrated system. Accordingly, roles may apply to the users in association with one or more courses that are provided by the source system and/or the integrated system.

The role of a user may depend upon a particular context. For example, a user may have a role of "student" in an advance biology course (e.g., Biology 401). That same user may have a different role in other courses. For example, that user may be a teaching assistant for an introductory biology course (e.g., Biology 101). Thus, in the introductory Biology course, the user may have a role of "teacher." Furthermore, a user may not only have different roles depending upon different contexts (e.g., such as a teacher in one course and a student in a different course), but may also have multiple roles in the same context. For example, a user might be both a student and a teaching assistant in the same course or a user might be both an alumni and a staff person at the same institution.

Systems and methods disclosed herein may provide access controls using role-based access permissions for components of the integrated system and/or software modules from one or more source systems or other third party systems. For example, during integration of a course from a source system to an integrated system, the integrated system may receive role data indicating user access to the course. That is, the roles that are associated with a user may define access rights of that user. Returning to the prior example, a user with a student role in Biology 401 may access course materials, lectures, and tests for the purposes of reading and taking the tests. That user may not, however, create and/or edit course materials, lectures, and tests for Biology 401. However, because the user has a role of "teacher" for Biology 101, that user may create and/or edit course materials, lectures, and tests for Biology 101. Similarly, any other users that have a role of "teacher" for Biology 101 may create and/or edit course materials, lectures, and tests for Biology 101. One or more of those other users may also have a role of "teacher" for Biology 401 and, therefore, may create and/or edit course materials, lectures, and tests for Biology 401. A user may have a different role in each course that the user is associated with and, accordingly, may have multiple roles in an institution. Furthermore, the user may have a role for a course in the source system and a different (or the same role) for a course in the integrated system. For example, access rights may be granted to users based on their role in association with a course or activity. A user may access resources in an integrated system and/or other third party resources based on the user's role. For example, a user that has a role of student in a course provided by a source system may also access other activities and resources (e.g., a biology tutorial) that are provided by or associated with the integrated system based on the user's role. Likewise, a user's role in association with a course and a domain may be used to determine access rights within the integrated system and externally.

As the term is used herein, an "entity" is any course, user, activity, organization (e.g., a student group), program, etc. A "domain" is defined by one or more characteristics that are associated with a set of entities (e.g. users, roles, courses, activities). The concept of a domain is flexible to accommodate any desired relationship. For example, a domain can include a plurality of courses, the users that are associated with each of the courses, and the roles of each user in relationship to each course. Thus, a domain may be used to establish relationships between entities (e.g., users, courses, activities) and include the role of each user in a course, activity, or other grouping. As another example, a domain can include a plurality of student groups, the users that are associated with each of the groups, and the roles of each user in relationship to each group. Accordingly, the same user may have multiple roles in one domain. Furthermore, one or more administrators may be associated with a domain and may have one or more roles for the domain (e.g., an administrator that can modify the domain and/or the entities in the domain).

Consistent with disclosed embodiments, a source identifier may identify a source system for data that is being integrated with the integrated system. The integrated system may use the source identifier for domain mapping. Accordingly, a domain may be automatically created that aligns with a source identifier of a source system in order to maintain a relationship between a source and integrated system. The domain for a source system may include all (or a subset) of the courses, users, and roles of the users in that source system. When a domain is created, the administrator of the source system data may become the administrator of the domain in the integrated system. Alternatively, a new administrator may be assigned for the domain after the integration.

As an example, a domain may be created for all biology courses. Some of the biology courses may be provided by a source system and some of the biology courses may be provided by the integrated system. Alternatively, all of the biology courses may be provided by the source system or all of the biology courses may be provided by the integrated system. In the present example, a domain is created for all biology courses, two of which are provided by a source system (an introductory level course and an intermediate level course) and one of which that is provided by the integrated system (an advanced level course). The domain may include data for the courses (introductory, intermediate, and advanced) and data for each user associated with each course (i.e., the teachers and students). Furthermore, the domain may include role data for each user that specifies the user's role in the context of a specific course. Some of the users may be associated with more than one course. For example, the same user may teach two of the courses. That user may be assigned a role of teacher in the beginning level course and the intermediate level course, for example. Moreover, a user may be associated with more than one course, but may have a different role in each of the courses, as explained above.

Consistent with disclosed embodiments, domains may be created for any characteristic that is associated with a set of entities. As discussed above, a domain may be created for all courses of a particular subject (e.g., biology). As another example, a domain may be created for all freshmen courses (e.g., all courses at the freshmen level). For such a domain, the domain may include data for all freshmen courses of all subjects, along with the users of each course. Furthermore, for each user, the domain may include the role of the user as it relates to a particular course. Accordingly, a user may appear in more than one domain. For example, a user that has a role of a student in one of the courses in the biology domain and who is also a freshmen may appear in other freshmen courses that are included in the domain for freshmen courses. Moreover, a user's role in association with a course and/or a domain may be used to determine access rights within the integrated system as well as to determine access rights to resources that are external to the integrated system.

Domains may be created for other characteristics, such as for all student organizations at an institution. Such a domain may include all of the organizations, their associated users, and the roles of each user in the context of each organization. As another example, a domain may be created for all activities that are targeted to commuter students. Such a domain may include all of the activities for commuters, the users associated with those activities, and the roles of the users in the context of each activity. As further examples, domains may be created for other characteristics such as ages of users, financial aid status of users, housing locations of users, housing status of users (on campus or off campus), etc.

Domains may also include other domains. For example, a domain may be established for all introductory level biology courses, another domain for all intermediate level biology courses, and another domain for all advanced level biology courses. Accordingly, the introductory level biology course domain may include all course sections of introductory biology, along with the users that are associated with each course, and the roles of each user in the context of each course. Similarly, the intermediate level biology course domain may include all course sections of intermediate biology, along with the users that are associated with each course, and the roles of each user in the context of each course. In a similar respect, the advanced level biology course domain may include all course sections of advanced biology, along with the users that are associated with each course, and the roles of each user in the context of each course. Some users may be included in multiple domains (e.g., a user that is a teacher who teaches all course levels or a user that is a student in an advanced course and a teacher in a beginning level course). Furthermore, a domain may be created for all biology courses at an institution, which may thus include the three aforementioned domains (i.e., introductory level courses, intermediate level courses, and advanced level courses).

FIG. 1 is an exemplary system 100 for integrating educational software modules, consistent with a disclosed embodiment. As shown, system 100 comprises integrated system 110, connected to source system 120 and source system 130 via communication links 144 and 146. Furthermore, integrated system 110 is connected via data link 142 to a user terminal (not shown) executing browser 150. Although a specific numbers of source systems (i.e., source systems 120 and 130) are depicted in FIG. 1, any number of these systems may be provided. Communication links 142, 144, and 146 may include any number of components or links. Moreover, integrated system 110 may be connected to any number of terminals executing browser software.

A network (not shown) provides communications between the various devices in system 100 over communication links 142-146, such as integrated system 110, source system 120, and source system 130, and terminals (not shown) executing browser software (e.g., browser 150). In addition, integrated system 110 may access other legacy systems (not shown) via the network, or may directly access legacy systems, databases, or other network applications. Legacy systems may include any additional source systems or other third party systems that have communications with, or may be accessed by users of, integrated system 110. The network may be a shared, public, or private network, may encompass a wide area or local area, and may be implemented through any suitable combination of wired and/or wireless communication networks. Furthermore, the network may comprise a local area network (LAN), a wide area network (WAN), an intranet, or the Internet.

Integrated system 110 may comprise a web server 112, an application server 114, and a database 116. Although integrated system 110 depicts web server 112, application server 114, and database 116 as separate components, these components may be combined. Any appropriate storage device may be substituted for database 116. Furthermore, components of integrated system 110 may distribute data for parallel processing by one or more additional servers (not shown). Web server 112 and application server 114 may also be implemented in a distributed network. Alternatively, web server 112 and application server 114 may be specially constructed for carrying-out methods consistent with disclosed embodiments.

Web server 112 may comprise a computer (e.g., a personal computer, network computer, server, or mainframe computer) having one or more processors (not shown) that may be selectively activated or reconfigured by a computer program. Web server 112 may provide functionality for authenticating users of integrated system 112 and transmitting content to users. Content may include (streaming) video, audio, text, or image data, including, for example, XML files, HTML files, etc. For example, web server 112 may host one or more computer programs for providing users access to a learning management system. Furthermore, web server 112 may provide content retrieved from database 116 over the network to users.

Application server 114 may comprise a computer (e.g., a personal computer, network computer, server, or mainframe computer) having one or more processors (not shown) that may be selectively activated or reconfigured by a computer program. Application server 114 may run computer programs and enable applications to communicate with web server 112. For example, application server 114 may store one or more software modules for providing a learning management system and may enable applications to communicate with web server 112. Furthermore, application server 113 may access content stored in database 116 and provide that content to web server 112 for transmission to users.

Database 116 may store data records for courses, user records, files, educational content, such as course materials, etc. Furthermore, although one database is shown in FIG. 1, application server 114 may interface with additional databases. Database 116 may receive data from the network.

Although shown as separate components in FIG. 1, web server 112, application server 114, and database 116 may be combined. Furthermore, any one of web server 112, application server 114, and database 116 may exchange data directly or via the network.

Browser 150 may be executed by any kind of terminal, such as any device that can communicate with integrated system 110. For example, terminals capable of executing browser 150 may be personal computers, handheld devices, or any other appropriate computing platform or device capable of exchanging data with the network. Terminals may each include a processor (not shown) and a memory (not shown). Furthermore, terminals may execute program modules that provide one or more graphical user interfaces (GUIs) for interacting with network resources (e.g., generating browser 150) and/or accessing integrated system 110.

Source systems 120 and 130 may include web servers 122 and 132, respectively, and databases 124 and 134, respectively. For example, web server 122 of source system 120 may directly interface with user terminals (not shown) or may interface with integrated system 110 over data link 144. Furthermore, source system 120 may store data for courses in database 124. Although not shown, source systems 120 and 130 may each include an application server and, accordingly, be similar or identical in construction to integrated system 110. In one embodiment, a course provided by source system 120, which has been integrated into integrated system 110, may execute through integrated system 110. In a similar fashion, source system 130 may store data (e.g., lectures, course materials, etc.) for courses in database 134 and web server 132 may directly interface with user terminals (not shown) or may interface with integrated system 110 over data link 146.

Source systems 120 and 130, and integrated system 110 are configured such that users (e.g., students, teachers, administrators) continue to use their existing learning systems. As a result, users continue to use functionality for courses and experience course content in a familiar fashion. Visually, users may be welcomed into integrated system 110 and have access to courses provided by source system 120 and/or source system 130 within, for example, a user interface that is generated by integrated system 110. For example, data identifying courses, as well as user data, role data, and/or enrollment data may be integrated into integrated system 110. However, software that provides the course (e.g., lectures, course materials, etc.) remains on source system 120 and/or source system 130 and is not integrated into integrated system 110. User interfaces for managing an integration and allowing access to courses that have been integrated are discussed below in further detail in connection with FIGS. 3-10. Accordingly, integrated system 110 may provide access to courses maintained on source system 120 and/or 130. Integrated system 110 may further provide access to native courses that are stored in integrated system 110.

FIG. 2 is an exemplary diagram 200 showing data flow in the system of FIG. 1, consistent with a disclosed embodiment. In particular, diagram 200 shows a flow of data 210 from source system 120 to integrated system 110 during an integration process. Integrated system 110 may also send data to source system 120. Integrated system 110 may also integrate data from one or more additional source systems (e.g. source system 130, etc.). Furthermore, administrators may have discretion as to how an integration is performed. For example, administrators may select whether to integrate a course once or to keep the integration dynamically updated according to a schedule. As another example, administrators may select whether changes within integrated system 110 automatically propagate back to source systems 120 and 130 and/or whether changes to source systems 120 and 130 automatically propagate to integrated system 110. Accordingly, administrators may select whether an integrated system or a source system is considered the master system as to data changes.

Furthermore, in other embodiments, data may be obtained from a source system for use by integrated system 110 as needed or during an integration. Some data may continue to reside on the source system, for example, or may reside on both the source system and integrated system 110. Additionally, in some embodiments, integrated system 110 may transmit or "push" data to a source system in order to, for example, provide updated information to the source system.

During an integration process, data 210 is received by integrated system 110 from source system 120. Furthermore, integrated system 110 may store data 210 in database 116. For example, an application executing on, for example, application server 114, may allow an administrator to configure an integration process. Subsequent to the integration, the integrated course is accessible to users via integrated system 110 as if the course is being provided by integrated system 110. However, the actual course application for the course remains stored in source system 120. Accordingly, changes made to the course at source system 120 do not need to be provided to integrated system 110. Furthermore, browser 150 may be redirected to source system 120 to obtain the course for inclusion in a frameset displayed on a user interface, as discussed below in further detail.

Data 210 may include user data 212, course data 214, and enrollment data 216. User data 212 may include data pertaining to users of a course provided by a source system. For example, user data 212 may include username, first name, last name, password, gender, birthday, e-mail address, home phone number, fax number, mobile phone number, street address, city, state, ZIP code, country. Course data 214 may include data pertaining to a particular course being provided by source system 120. For example, metadata for a course may indicate the course ID, course name, description, instructor, meeting times and/or dates. Enrollment data 216 may identify users enrolled in a particular course. For example, enrollment data 216 may specify the first and last names and usernames included in user data 212. Enrollment data 216 may further include other information related to the user's enrollment in a course, such as assignments and grades.

User data 212 may also include role data for one or more of the users in the context of the course that is being integrated. As discussed above, a role of a user may indicate whether the user is a student, teacher, alumni, administrator, or any other role for a particular course or activity. Integrated system 110 may use the role of a user to determine user access in the context of the course that is being integrated. In other implementations, a role may indicate user access in the context of an activity. For example, a user with an administrator role for a particular domain may modify or remove a course from the domain in the integrated system 110.

As an example, during an integration, integrated system 110 receives data 210 from source system 120 for an introductory level biology course. In this example, data 210 may include course data 214, which identifies the introductory biology course (e.g., metadata for the course name, instructor, meeting times and/or dates). Enrollment data 216 may identify users enrolled in the introductory biology course. User data 212 may include information for users of the course (e.g., data identifying teachers and students). Furthermore, role data may indicate the role of the users in the introductory biology course. For example, one of the users of the introductory biology course may have a role of "student" in the course.

That same user may have a different role in other courses that are provided by the integrated system 110 or in other courses that are provided by the same or other source systems. For example, that same user may have a role of a teacher in other courses. Furthermore, another user of the introductory biology course may have a role of a teacher in this course. Integrated system 110 may use the role data of a user to determine user access in the introductory biology course integrated from source system 120. Moreover, integrated system 110 may use the role data of the user to determine access rights of the user to other resources/tools that are provided by integrated system 110 or any other system, including third party systems, which are external to integrated system 110. Thus, a user with a student role in the introductory biology course may access course materials, lectures, and tests for the purposes of reading and taking the tests. That user may not, however, create and/or edit course materials, lectures, and tests for this course. By contrast, a user that has a role of "teacher" for the course may create and/or edit course materials, lectures, and tests for the course. Moreover, the user's role may determine the user's access rights in integrated system 110 and/or other third party resources. For example, a user that has a role of student in the introductory biology course may access the course that is provided via source system 120. Furthermore, that user, based on the user's role as a student, may also access a biology tutorial provided by integrated system 110.

During the integration, integrated system 110 may receive or create a source identifier that identifies source system 120. Integrated system 110 may use the source identifier to create a domain for source system 120. For example, the domain for source system 120 may include data that represents all of the courses, the users that are associated with each of the courses, and the roles of each user in each of the courses. The administrator assigned to that domain in source system 120 may become the administrator of the domain in integrated system 110. Alternatively, a new administrator may be assigned for the domain once the domain has been integrated into integrated system 110. Domains may be created for courses and/or activities related to source system 120, as well as may be created for courses and/or activities that are related to both source system 120 and integrated system 110. The creation of domains after an integration is discussed below in further detail.

FIG. 3 is an exemplary user interface 300 for integrating a source system, consistent with a disclosed embodiment. For example, a system administrator can integrate a course from a source system (e.g., source system 120 and/or source system 130) by selecting a link in an interface (not shown) that is provided by integrated system 110. A configuration interface, such as user interface 300, may include options for selection by an administrator, such as whether to enable an integration process. User interface 300 may allow an administrator to specify an address, such as a uniform resource locator (URL), of a source system from which a course is being integrated. During the integration, data 210, as discussed above in connection with FIG. 2, may be integrated from a source system into integrated system 110.

FIG. 4 is another exemplary user interface 400 for integrating a source system into an integrated system, consistent with a disclosed embodiment. User interface 400 may allow an administrator to specify a "data source key" to identify data from a particular integration. The data source key may be any unique identifier that specifies a source system, such as any alphanumeric identifier. Accordingly, data that is copied to integrated system 110 may be identified as having originated from source system 120, for example, based on the data source key. Through user interface 400, an administrator may set import settings, such as indicating a type of learning system corresponding to a course maintained by a source system. User interface 400 may provide conflict resolution options. For example, an administrator may specify whether to change the data coming from source system 120 so that it does not collide with unique identifiers from other source systems or the integrated system.

Moreover, the data source key may be used to automatically create a domain for the source system. For example, integrated system 110 may create a domain for the source system in order to maintain a relationship between a source and integrated system. The domain may include all of the courses, users, and roles of the users in each course that is being integrated into integrated system 110. When a domain is created for a source system, the administrator of the data in the source system may become the administrator of the domain in the integrated system. Alternatively, a new administrator may be assigned for the domain after the integrated takes place.

Figure 5:
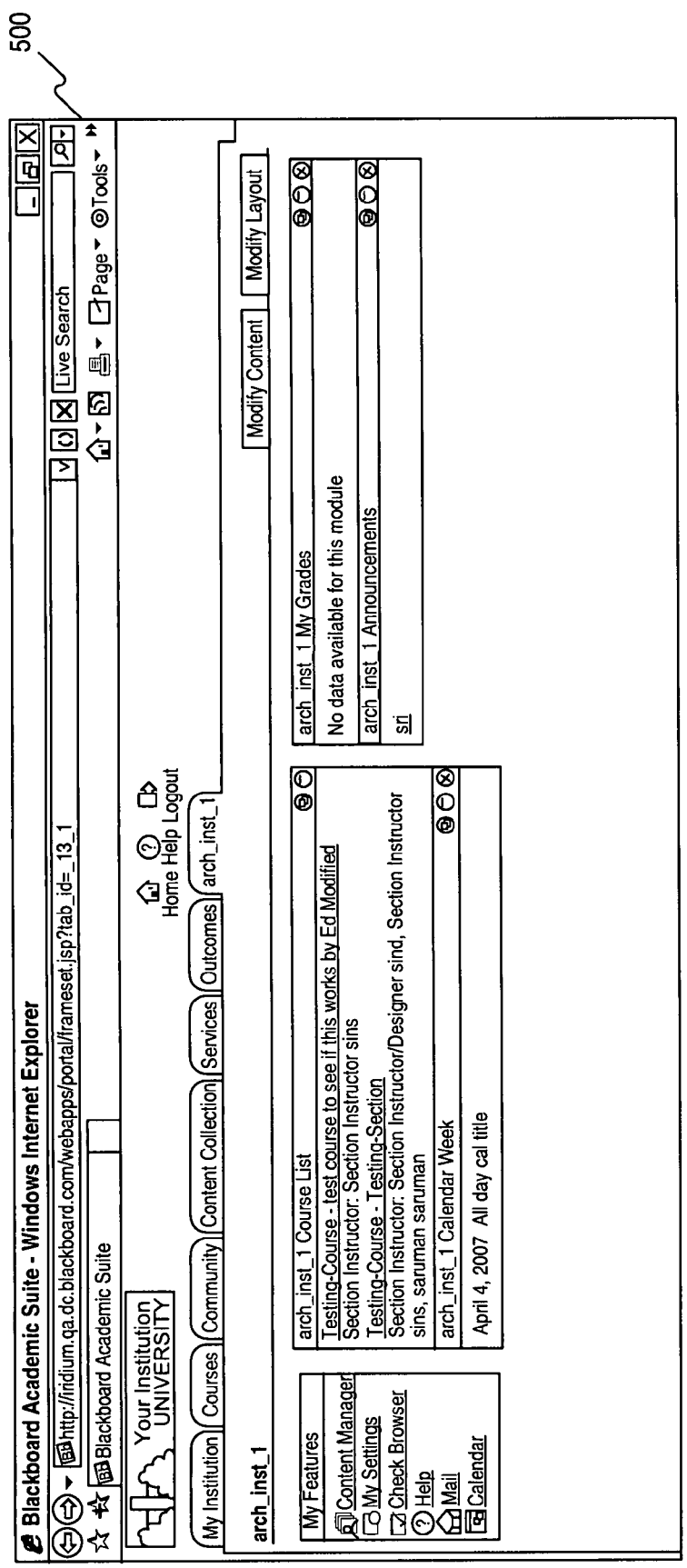
FIG. 5 is an exemplary user interface for accessing an integrated system, consistent with a disclosed embodiment.

FIG. 5 is an exemplary user interface 500 for accessing an integrated system, consistent with a disclosed embodiment. User interface 500 allows an administrator to view the results of an integration process and to test links to a course. Furthermore, an administrator may test links to grades or other features. Through the "My Features" options, the administrator may access additional options (e.g., Content Manager, My Settings, Check Browser, Help, Mail, and Calendar). Using the tabs found on user interface 500, the administrator may select other options (e.g., My Institution, Courses, Community, Collection, Services, and Outcomes).

Figure 6:
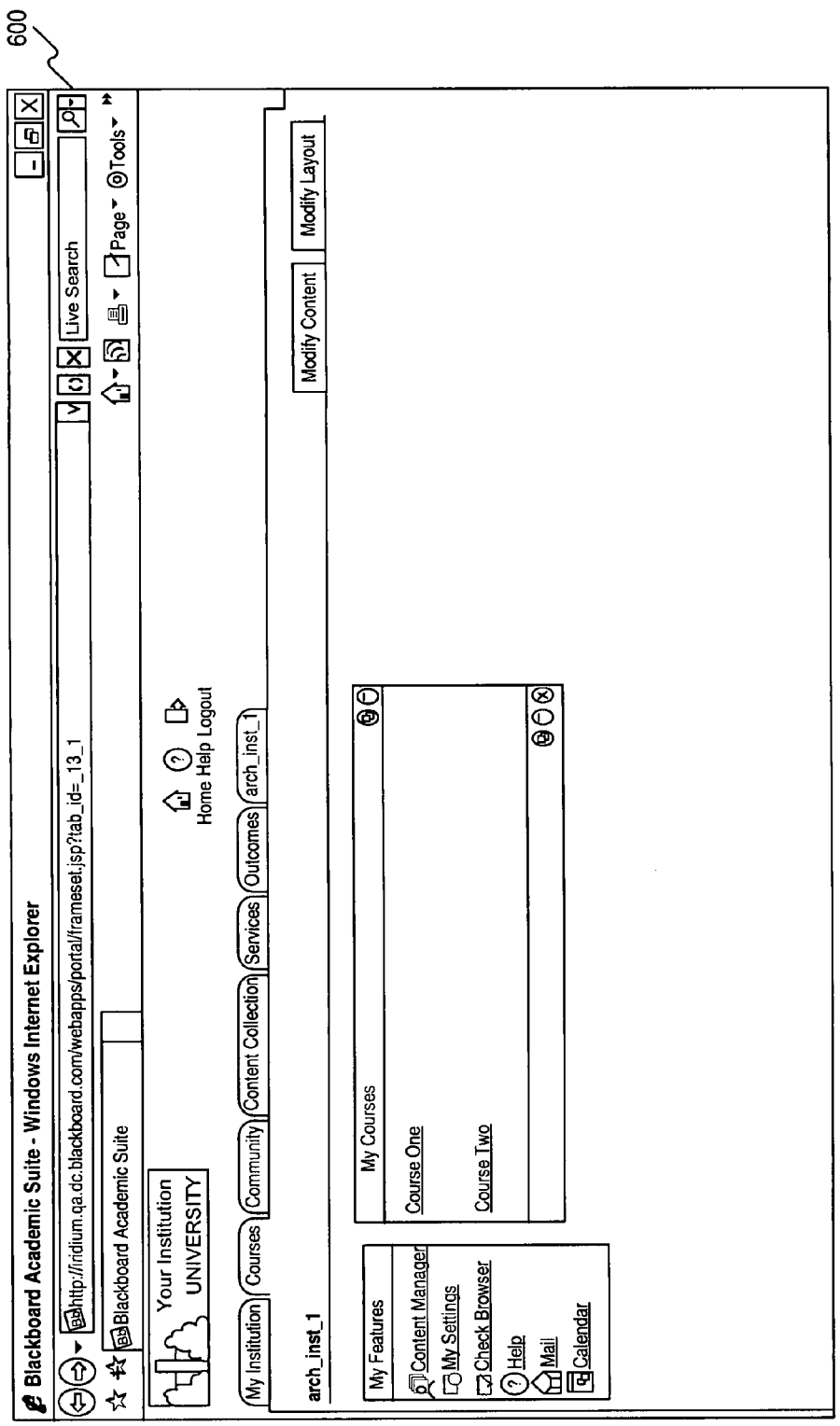
FIG. 6 is an exemplary user interface for selecting a course in an integrated system, consistent with a disclosed embodiment.

FIG. 6 is an exemplary user interface 600 for selecting a course in an integrated system, consistent with a disclosed embodiment. For example, integrated system 110 may display user interface 600 to a student user. User interface 600 may include a logo or name of an institution (e.g., Your Institution University) of the student user. Logos, images, text, or other information and tools for users may be tailored to the user based on information that was received during the integration process. In an integrated experience, new integrations may establish access to a course on a dedicated "Course" tab. For example, as shown in FIG. 6, the "Courses" tab is selected. From user interface 600, a student user may select functionality specific to a course provided by a source system (e.g.,. Course One or Course Two). By selecting, such as by clicking on the course name (e.g. Course One), the authenticated user obtains access to the course. That is, for example, the course content is received from a source system by integrated system 110, which displays the course content in a frame, as discussed below in connection with FIG. 7 in greater detail.

Figure 7:
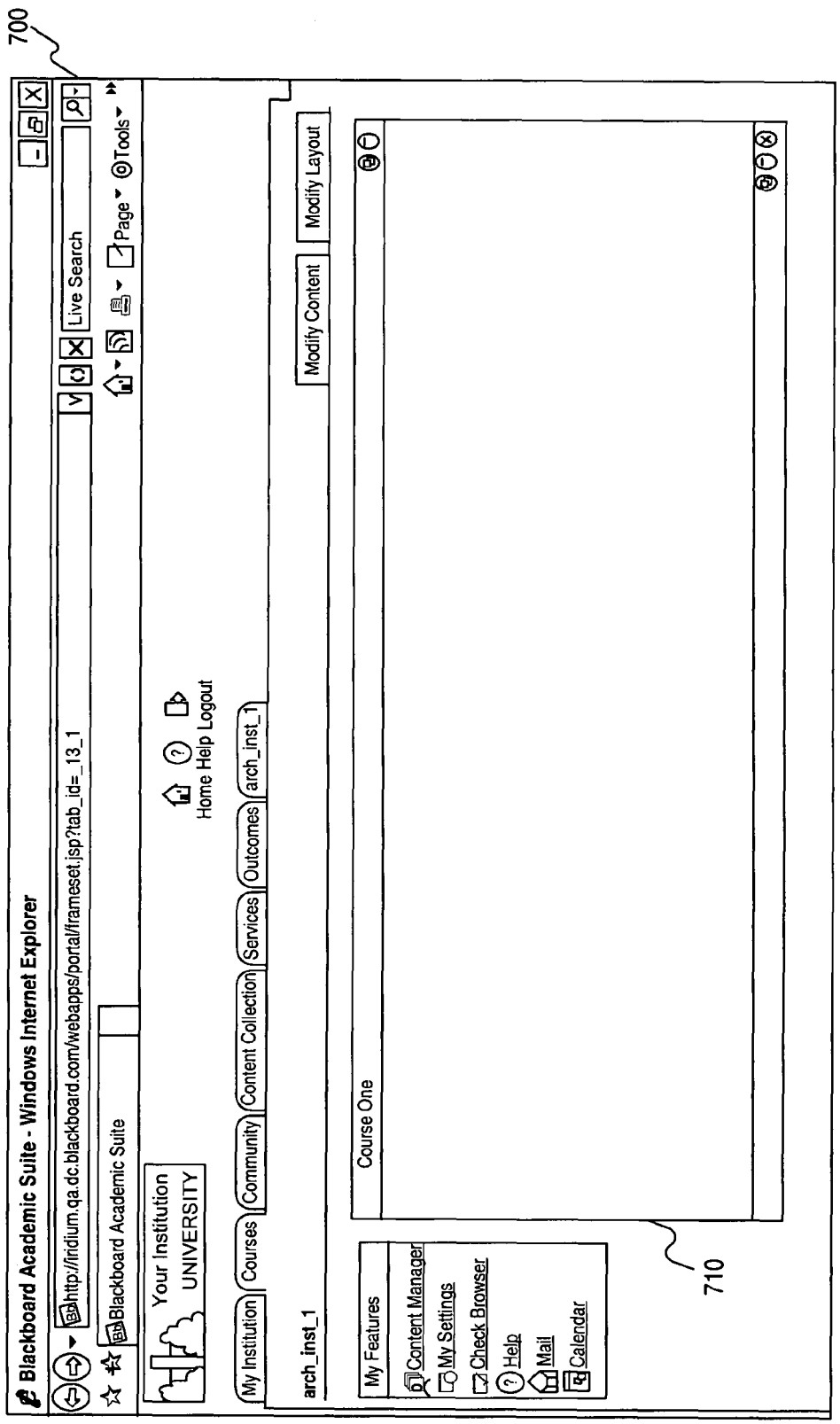
FIG. 7 is an exemplary user interface for a course from a source system that is embedded in a frame displayed by an integrated system, consistent with a disclosed embodiment.

FIG. 7 is an exemplary user interface 700 of a course from a source system (e.g., source system 120 or source system 130) embedded in a frame 710 displayed by integrated system 110, consistent with a disclosed embodiment. For example, frame 710 may display course content for Course One.

Furthermore, any user who is enrolled in courses/sections can access grades in a "My Grades" system tool from all of the courses/sections that the user has access to. Any user can manage their personal information settings from a single point inside the integrated system (e.g., through the "My Features" options). Priority settings such as Locale, Privacy, and Password can be changed inside integrated system 110 and other settings will apply to a respective source system.

Figure 8:
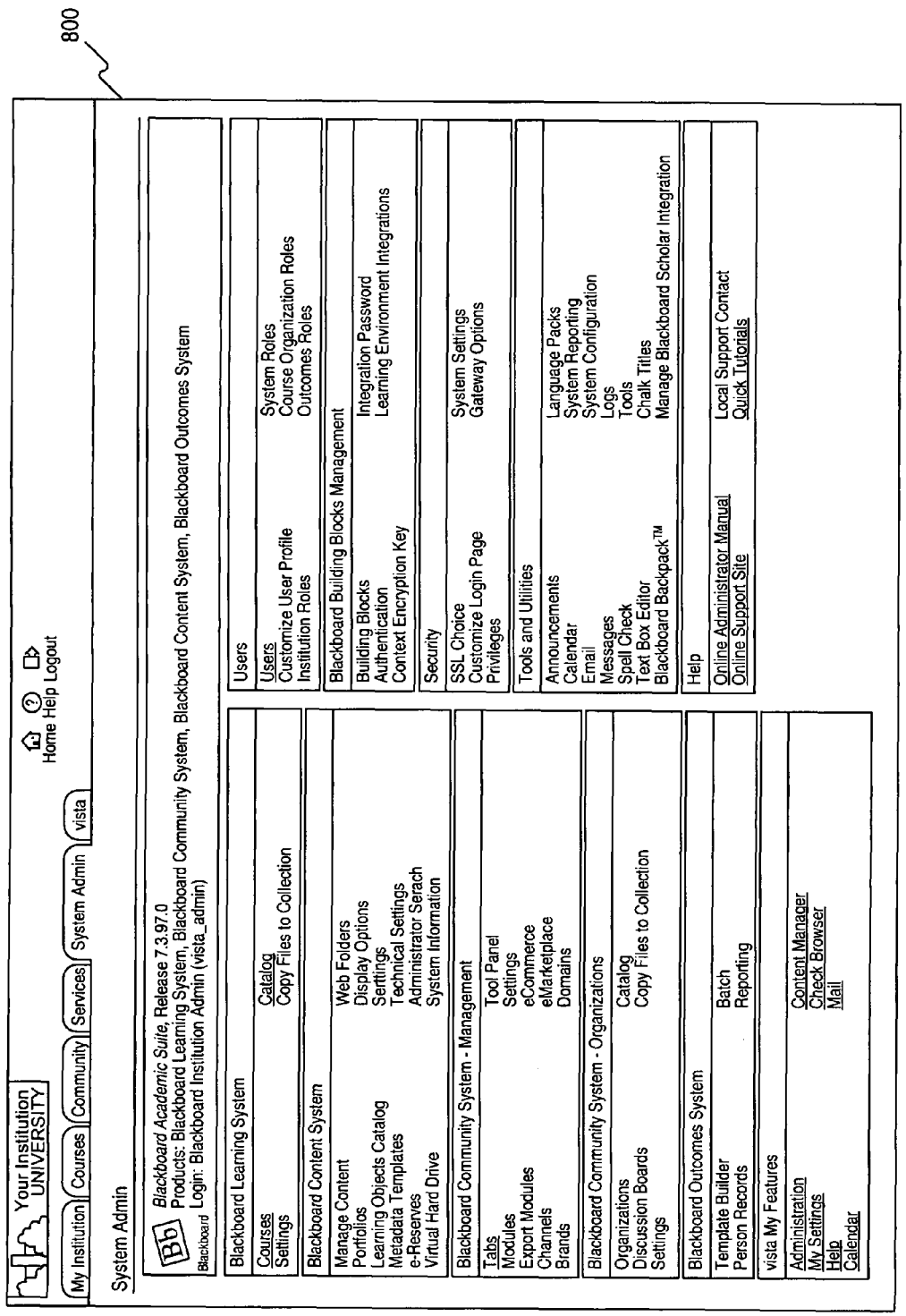
FIG. 8 is an exemplary user interface for an administrator to manage an integrated system, consistent with a disclosed embodiment.

FIG. 8 is an exemplary user interface 800 for an administrator to manage an integrated system, consistent with a disclosed embodiment. For example, an administrator may reach user interface 800 by selecting a "System Admin" tab.

User interface 800 may provide administrators with access to learning system, content system, and community system functionality. Administrators may access user profiles, adjust security settings, access tools and utilities, and access help functionality.

For example, administrator users who can manage users are able to add, modify, and remove users. Access to this functionality may be controlled by domains, as is described in detail below. Administrator users who can manage courses/sections are able to access courses/sections for both integrated system 110 and source systems. Administrator users can access, add, modify, and remove both integrated system 110 and source system courses/sections, enrollments, and users. As a result, via integrated system 110, administrators may access a consolidated course list and/or course catalog that includes courses from both integrated system 110 and one or more source systems. For example, course metadata may include data that is translated into new uses in integrated system 110, such as course categories that are integrated from source system 120 or 130 and that are used to generate the course catalog in integrated system 110.

Figure 9:
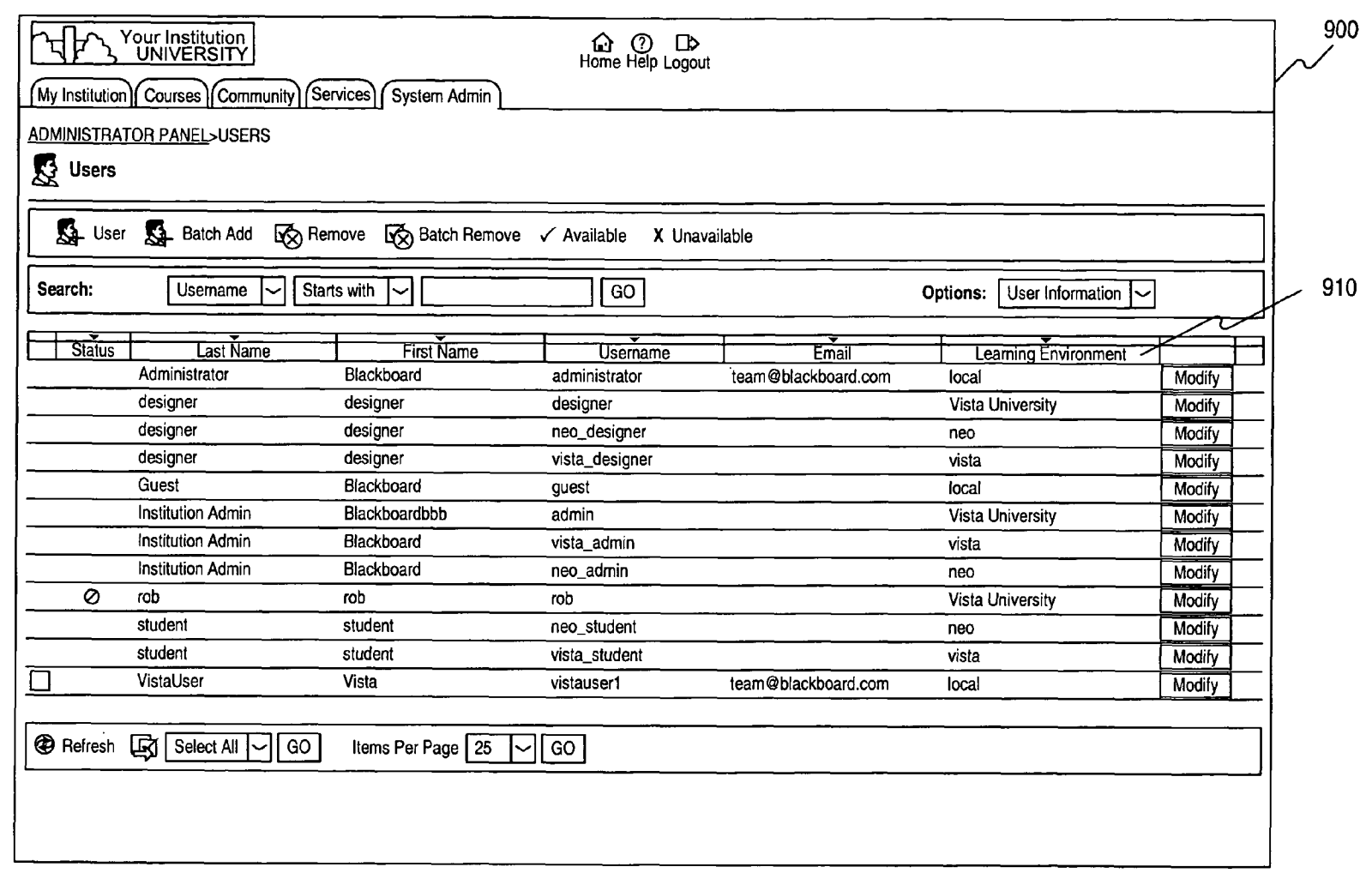

FIG. 9 is an exemplary user interface 900 for an administrator to search and view user profiles, consistent with a disclosed embodiment. User interface 900 may provide functionality for an administrator to search user profiles by username or other fields, such as email address or source system, for example. As shown in the "Learning Environment" column 910, user interface 900 identifies that certain records originated from other source systems (e.g., Vista).

Figure 10:
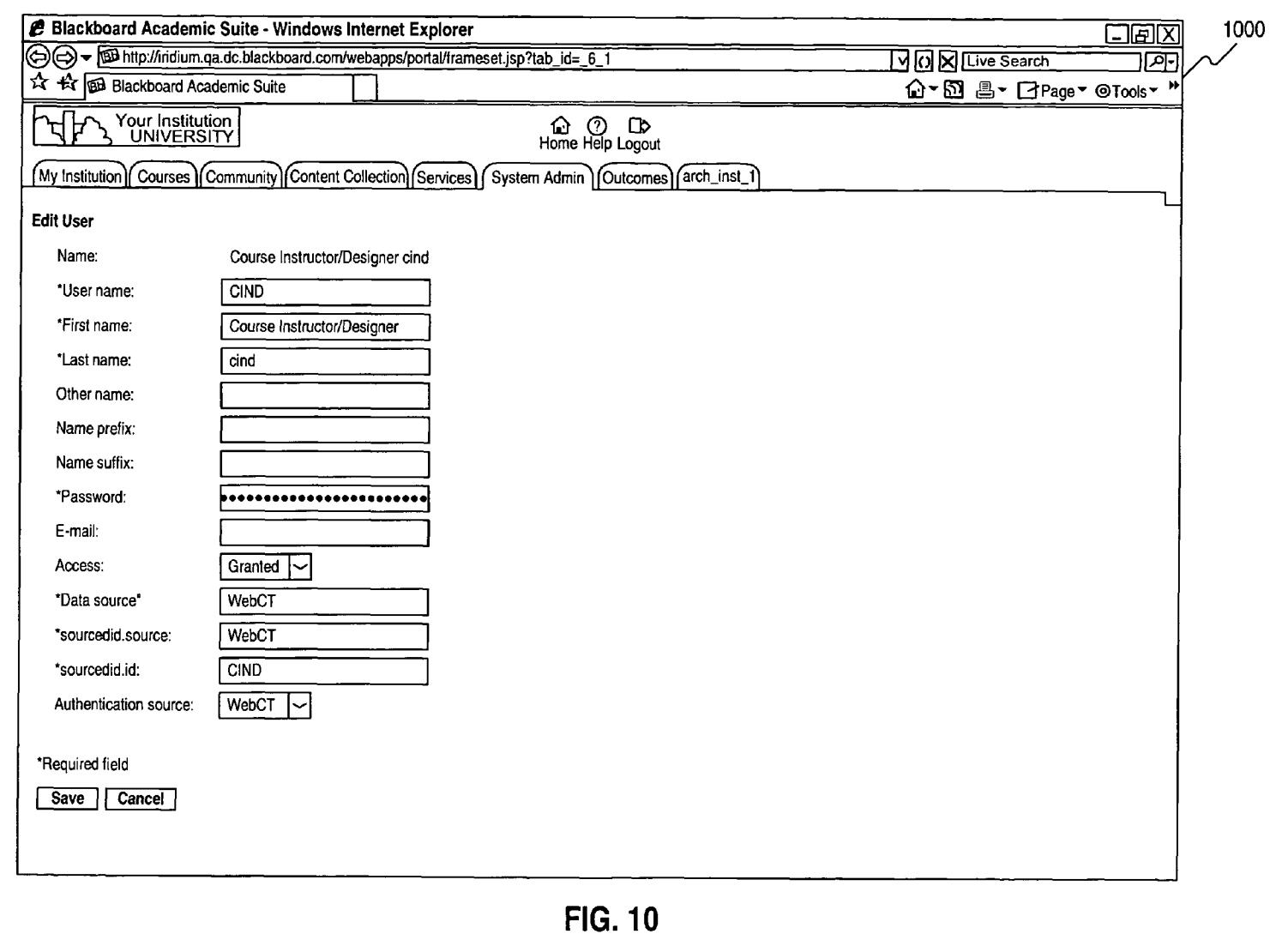

FIG. 10 is an exemplary user interface 1000 for an administrator to edit a user profile, consistent with a disclosed embodiment. For example, an administrator may reach user interface 1000 by selecting "Users" from user interface 800. An administrator may access, create, or change a username, first name, last name, other name, name prefix, name suffix, password, and e-mail address, etc. Furthermore, an administrator may specify a data source, a source identifier, and a source ID identifier. The data source may indicate a name of a source system. The source identifier is an identifier that may indicate the source system (and may be the same or different from the data source). The source ID identifier may indicate the username of the user in the source system.

Figure 11:
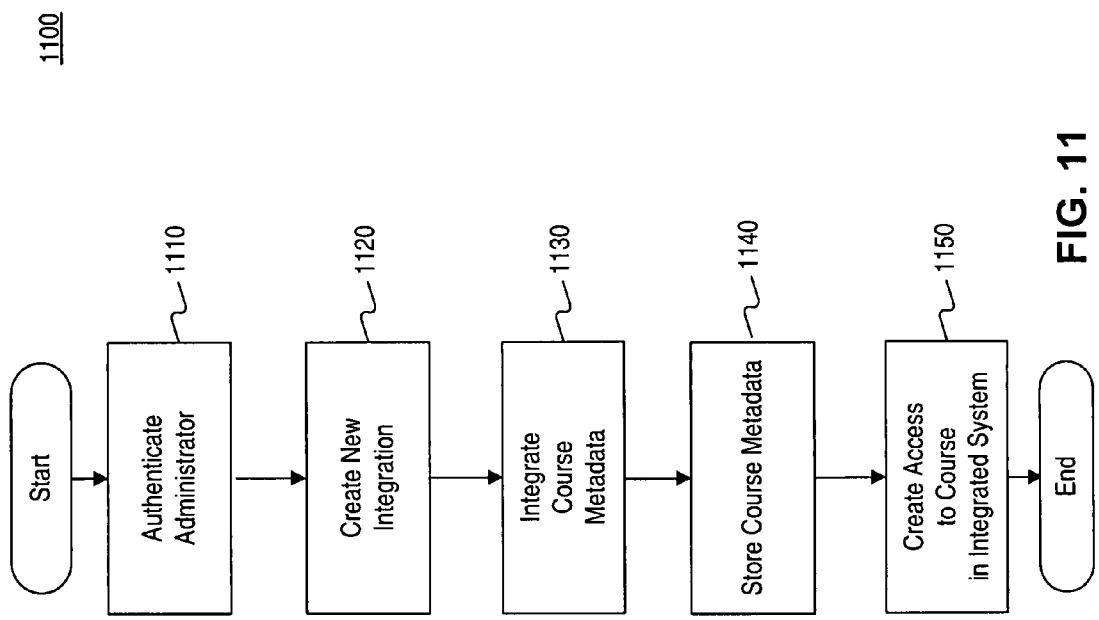
FIG. 11 is an exemplary flow diagram of a method for integrating data from a source system, consistent with a disclosed embodiment.

FIG. 11 is an exemplary flow diagram 1100 of a method for integrating data from source system 120 or 130, consistent with a disclosed embodiment. Flow diagram 110 may implement processes according to one or more program modules stored by application server 114.

In step 1110, integrated system 110 may authenticate an administrator. For example, the administrator may submit credentials (e.g., a username and password) for authentication through browser 150. Once authenticated, browser 150 may navigate to a user interface providing selectable options.

In step 1120, the administrator may select an option to create a new integration or integrate a new set of courses. For example, from a user interface, the administrator may select an option to create a new integration and browser 150 may navigate to one or more user interfaces for selecting parameters of the integration (e.g., user interface 300 and/or 400). User interface 300 facilitates the integration process. Furthermore, user interface 300 may allow an administrator to specify an address, such as a uniform resource locator (URL), of a source system from which a course is being integrated. User interface 400 may allow an administrator to specify a data source key in order to identify data from a particular integration. The data source key may be any unique identifier. Accordingly, data that is copied to integrated system 110 may be identified as having originated from source system 120, for example, based on the data source key. Furthermore, the data source key may be used to automatically create a domain for the source system. For example, integrated system 110 may create a domain that includes all of the courses, users, and roles of the users in each course that is being integrated into integrated system 110. Through user interface 400, an administrator may set import settings, such as indicating a type of learning system corresponding to a course maintained by a source system. Furthermore, user interface 400 may provide conflict resolution options.

In step 1130, integrated system 110 may integrate course metadata from a source system (e.g., source system 120 or 130). As discussed in connection with FIG. 2, during an integration process, data for a course (e.g., data 210) may include user data 212, course data 214, and enrollment data 216. User data 212 may include data pertaining to users of a course provided by the source system, including role data for users that indicates a role of each user in the context of a particular course or activity. Course data 214 may include data pertaining to a particular course being provided by source system 120. Enrollment data 216 may identify users enrolled in a particular course.

In step 1140, integrated course metadata from the source system may be stored in database 116 of integrated system 110. Furthermore, database 116 may associate the integrated course metadata with location information specifying the location of the course. Location information may include, for example, an Internet address, such as a uniform resource locator (URL). Accordingly, course metadata (e.g., data 210) is integrated into integrated system 110.

In step 1150, integrated system 110 may create access to the course in integrated system 110. For example, integrated system 110 may store in web server 112 a file (e.g., a document or a webpage) that may be displayed in a portion of an interface (e.g., a frame, such as frame 710) of a user interface that is generated by integrated system 110. A browser may be redirected to the source system (e.g., source system 120 or 130) to obtain the course for inclusion in a page displayed on a user interface. Accordingly, the browser may automatically access the source system and display the course.

Figure 12:
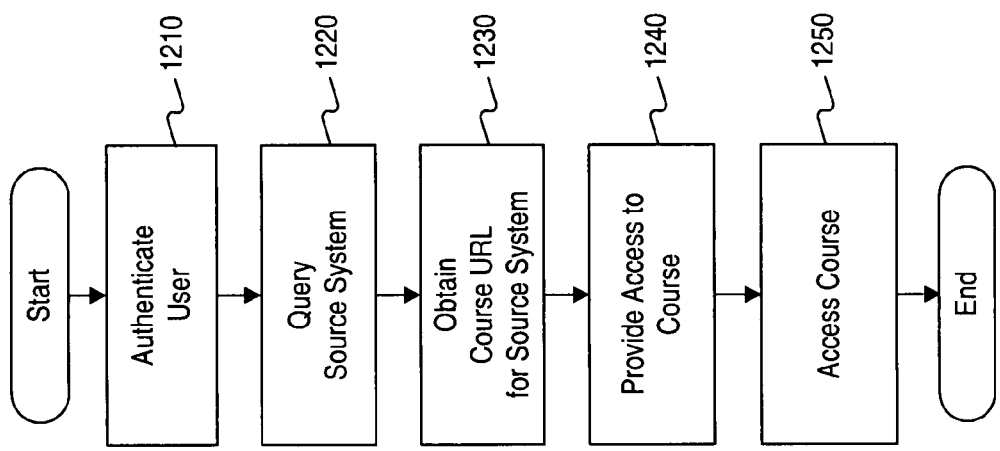
FIG. 12 is an exemplary flow diagram of a method for accessing an integrated course provided by a source system, consistent with a disclosed embodiment.

FIG. 12 is an exemplary flow diagram 1200 of a method for accessing an integrated course provided by a source system, consistent with a disclosed embodiment. In step 1210, integrated system 110 may authenticate a user, such as student or a teacher. For example, the user may submit credentials (e.g., a username and password) for authentication through browser 150. Once authenticated, the user may use browser 150 to navigate to a user interface providing selectable options. The user interface (e.g., user interface 600) may include a logo or name of an institution (e.g., your University) as well as other information and activities tailored to the user's specific learning needs. The user may select a course provided by a source system (e.g., Course One or Course Two, as shown in user interface 600). In this example, Course One is selected by the user and may be maintained by source system 120.

In step 1220, integrated system 110 may query source system 120. The query may include appropriate credentials identifying the user for authentication by source system 120. Furthermore, the query may request an address (e.g., URL) for launching the course in browser 150.

In step 1230, integrated system 110 may receive the address for the course from source system 130. Next, in step 1240, integrated system 110 may provide access to the course. For example, integrated system 110 may load, in a portion of a display (e.g., a frame) generated by browser 150, data that is received from the address. The data received from the address may include a course and associated course content. In step 1250, a user at browser 150 may access the course via, for example, a frame displayed in a user interface generated by integrated system 110 (e.g., frame 710 may display course content for Course One, as shown in FIG. 7).

Figure 13:
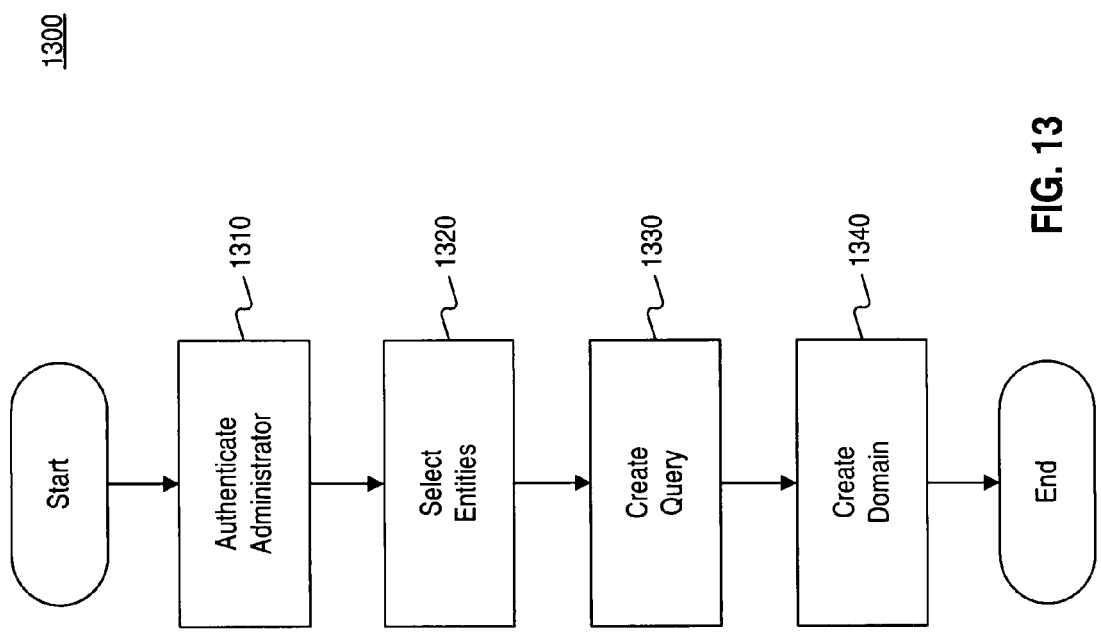
FIG. 13 is an exemplary flow diagram of a method for creating a domain for entities in an integrated system, consistent with a disclosed embodiment.

FIG. 13 is an exemplary flow diagram 1300 of a method for creating a domain for entities in an integrated system, consistent with a disclosed embodiment. As discussed above, a domain may be automatically created for a source system during an integration. Furthermore, a domain may be manually created based on criteria specified by a user, such as an administrator.

As also discussed above, users may have different roles for different domains. For example, a user may have an administrator role for a first domain (e.g., a course and enrollments from source system 120), but might not have an administrator role for another domain (e.g., a course and enrollments from source system 130). Furthermore, users may be included in a plurality of domains. Embodiments of the present invention may establish domains for an entire source system, for a single course, for a grouping of courses, for a grouping of activities, or for other groupings. For example, domains may be based on departments, a group of courses, course level, or groups of users (e.g., a domain for all freshmen, a domain for all students receiving financial aid, etc.). If a domain is created that includes all of the courses from a particular source system, an administrator can be automatically or manually set up to be the manager of that domain. The source system could represent an institution, for example, or multiple source systems may be integrated for use by one institution. As discussed above, domains may be created for other characteristics and domains may also include other domains.

Referring now to FIG. 13, in step 1310, integrated system 110 may authenticate an administrator. For example, the administrator may submit credentials (e.g., a username and password) for authentication through browser 150. Once authenticated, browser 150 may navigate to a user interface providing selectable options. The administrator may select an option to access, create, or edit domains. For example, administrators who are domain administrators may manage domain-defined subsets of courses regardless of whether those courses are provided by integrated system 110 or source systems 120 and 130.

In step 1320, integrated system 110 may receive a selection of entities from the administrator for the domain. As an example, a domain may be created for all biology courses, two of which are provided by a source system (an introductory level course and an intermediate level course) and one of which that is provided by integrated system 110 (an advanced level course). The domain includes data for the courses (introductory, intermediate, and advanced) and data for each user associated with each course (i.e., the teachers and students). Furthermore, the domain includes role data for each user that specifies the user's role in the context of a specific course.

In step 1330, integrated system 110 may create a query for the entities selected by the administrator. For example, integrated system 110 may access database 116 and determine which courses are introductory biology courses. The courses may be provided by a source system -and/or may be native courses to integrated system 110. Integrated system 110 may query, for example, database 116. Furthermore, integrated system 110 may retrieve metadata for all courses that are introductory biology, along with associated metadata for the courses, including the users associated with each of the courses and the roles of each of the users in each course.

Next, in step 1340, integrated system 110 may create a domain in database 116 associating the metadata that was received from the query with the domain.

Administrators may also modify domains. Furthermore, when students are no longer enrolled in a course, any domain containing that course may be automatically updated. Further still, integrated system 110 may automatically create a domain in integrated system 110 during the integration of a course from source system 120 or 130. For example, during integration of the course, a domain may be established in integrated system 110 for all students that are enrolled in a course provided by source system 120.

FIG. 14 is an exemplary flow diagram 1400 of a method for merging user accounts in an integrated system, consistent with a disclosed embodiment.

In step 1410, integrated system 110 may identify two or more accounts that may be use by the same user. For example, integrated system 110 may, via application server 114, execute a tool for comparing usernames stored in database 116 against each other. For example, integrated system 110 may launch the tool following an integration process in order to determine whether any usernames from the integration appear to already have existing accounts in integrated system 110.

In step 1420, integrated system 110 may examine potential duplicates. For example, the tool discussed above may implement a process to compare certain data associated with accounts having the same or similar usernames (e.g., comparing social security numbers, student ID numbers, etc.). Alternatively, an administrator of integrated system 110 may perform a manual examination of potential duplicates.

In step 1430, integrated system 110 may make a determination that at least two accounts pertain to the same individual. Alternatively, an administrator of integrated system 110 may make the determination. Furthermore, in this step, integrated system 110 may send a notification (e.g., email) to the users of the accounts requesting confirmation that the accounts do in fact pertain to the same individual.

In step 1440, integrated system may merge the accounts. For example, data for one account may be merged with data for another and the username for one of the accounts may be deactivated.

The foregoing description has been presented for purposes of illustration. It is not exhaustive and does not limit the invention to the precise forms or embodiments disclosed. Modifications and adaptations of the embodiments will be apparent from consideration of the specification and practice of the disclosed embodiments. Although the steps of the above methods are indicated in a particular order, one of ordinary skill will appreciate that order of the steps may be changed and, in some implementations, some steps may be optional. Furthermore, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, embodiments may use different types of computer-readable media, such as secondary storage devices, for example, hard disks, floppy disks, or CD-ROM, the Internet or other propagation medium, or other forms of RAM or ROM.

Computer programs based on the written description and methods of this specification are within the skill of a software developer. The various programs or program modules can be created using a variety of programming techniques. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments have been described herein, the scope of the invention includes any and all embodiments having equivalent elements, modifications, omissions, combinations (e.g., of aspects across various embodiments), adaptations and/or alterations based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit of the invention being indicated by the following claims and their full scope of equivalents.

What is claimed is:

1. A computer-implemented method for integrating educational software, the method comprising:
   receiving, by a first server, an identifier of a second server that provides at least one source educational course;
   receiving, from the second server, metadata for the at least one source educational course; and
   storing the metadata for the at least one source educational course,
   wherein the metadata for the at least one source educational course comprises location information specifying an address of the at least one source educational course.

2. The method of claim 1, wherein the metadata is stored in a database that is coupled to the first server.

3. The method of claim 1, further comprising:
   providing access, from the first server, to the at least one source educational course.

4. The method of claim 1, wherein the metadata indicates at least one role of a user of the at least one source educational course, the method further comprising:
   storing the role of the user in the first server; and
   providing, by the first server, the user with access rights based on the role.

5. The method of claim 4, wherein the access rights specify a type of access that the user can have to content associated with the at least one source educational course.

6. The method of claim 1, wherein the metadata for the at least educational course comprises user data, course data, and role data.

7. The method of claim 1, further comprising:
   transmitting data associated with the at least one source educational course from the first server to a user terminal.

8. The method of claim 5, further comprising:
   determining, by the first server, whether the user data pertains to a user already having an account administered by the first server; and
   merging the accounts if the user data pertains to a user already having an account administered by the first server.

9. The method of claim 1, further comprising:
   receiving, by the first server, a second identifier of a third server that provides a second source educational course.

10. A computer-implemented method for enabling access to educational software, the method comprising:
    receiving, at a first server, a selection of an educational course;
    determining, by the first server, a storage location of the educational course, wherein the storage location resides on a second server;
    transmitting, by the first server, a query to the second server;
    receiving, by the first server, an address of the educational course that is stored on the second server; and
    enabling the first server to provide access to the educational course.

11. The method of claim 10, wherein enabling the first server to provide access to the educational course comprises:
    transmitting, by the first server, data associated with the at least one source educational course to a user terminal.

12. A computer-implemented method for integrating educational software, the method comprising:
    receiving, by a first server hosting at least one native educational course, an identifier of a second server that provides at least one source educational course;
    receiving, from the second server, metadata for the at least one source educational course, wherein the metadata includes a role of a user of the at least one source educational course;
    storing the metadata for the at least one source educational course in a storage device coupled to the first server;
    providing access, from the first server, to the at least one source educational course; and
    determining, by the first server, access rights of the user based on the role, wherein the access rights specify whether the user can access the least one source educational course and the at least one native educational course.

13. A computer-implemented method for integrating educational software, the method comprising:
    receiving, by a first server, role data for at least one user of at least one source educational course that is provided by a second server;
    storing the role data in a storage device coupled to the first server; and
    determining, by the first server, access rights of the at least one user based on the role data, wherein the access rights specify whether the user can access the least one source educational course.

14. The method of claim 13, further comprising:
    receiving, by the first server, an identifier of the second server that provides the at least one source educational course.

15. The method of claim 13, wherein the role data of the at least one user specifies whether the user has a role of student, teacher, or administrator.

16. A computerized system for integrating educational software, the system comprising:
    a storage device; and
    a first server coupled to the storage device, the first server:
      receiving an identifier of a second server that provides at least one source educational course;
      receiving, from the second server, metadata for the at least one source educational course; and
      storing the metadata for the at least one source educational course in the storage device,
    wherein the metadata for the at least one source educational course comprises location information specifying an address of the at least one source educational course.

17. The system of claim 16, wherein the first server provides access to the at least one source educational course.

18. The system of claim 16, wherein the first server further hosts at least one native educational course.

19. The system of claim 16, wherein the first server manages the at least one source educational course.

20. The system of claim 16, wherein the metadata indicates at least one role of a user of the at least one source educational course, the first server storing the role of the user in the first server and providing the user with access rights based on the role.

21. The system of claim 20, wherein the access rights specify a type of access that the user can have to content associated with the at least one source educational course.

22. The system of claim 16, wherein the metadata for the at least educational course comprises user data, course data, and role data.

23. The system of claim 16, wherein the metadata for the at least one source educational course comprises location information specifying an address of the at least one source educational course.

24. The system of claim 16, wherein the first server transmits the data associated with the at least one source educational course to a user terminal.

25. A computer-implemented method for automatically creating a domain during a system integration of educational software, the method comprising:
   identifying a source identifier that is associated with at least one source educational course;
   automatically establishing the domain, the domain being identified by the source identifier and including metadata associated with the at least one source educational course; and
   storing the metadata.

26. The method of claim 25, wherein the source identifier is identified by a first server and data associated with the at least one source educational course is stored on a second server and is accessible via the first server.

27. The method of claim 25, wherein the metadata for the at least one source educational course includes course data, user data for users associated with the at least one source educational course, and role data for each of the users in the context of the at least one source educational course.

28. The method of claim 27, wherein the role data provides access levels of the users associated with the at least one source educational course.

29. The method of claim 28, further comprising:
   providing, based on the access levels, users of the first server with access to data stored in the first server or the second server.

30. The method of claim 25, further comprising:
   associating an administrator with the domain; and
   determining whether the administrator has access rights to modify the domain.

31. The method of claim 25, wherein the metadata provides at least one of course data for the at least one source educational course, user data for users that are associated with the at least one source educational course, and role data for users that are associated with the at least one source educational course.

32. The method of claim 25, wherein the metadata is stored in a storage device that is included in or coupled to the first server.

33. The method of claim 32, wherein the storage device further stores metadata for additional domains, and users of the first server have one or more roles in one or more of the domains or in one or more courses associated with the domains.

34. A computer-implemented method for creating a domain, the method comprising:
   receiving a request to integrate a course to a first server from a second server;
   determining, from domain-specific information associated with the course, that the course should be included in an existing domain provided by the first server; and
   storing the course in the existing domain.

35. A computer-implemented method for creating a domain, the method comprising:
   receiving a request to integrate a course to a first server from a second server;
   establishing, from any domain-specific information associated with the course, a domain for the course in the first server; and
   permitting access to the course via the first server based on the domain.

36. The method of claim 35, wherein establishing the domain includes:
   identifying the domain-specific information in data associated with the course, wherein the domain-specific information includes roles of users associated with the course.

37. The method of claim 36, wherein identifying the domain-specific information further includes:
   identifying, from the data associated with the course, an instructor associated with the course.

38. The method of claim 36, wherein identifying the domain-specific information includes:
   identifying, from the data associated with the course, at least one student associated with the course.

39. The method of claim 35, wherein an instructor has permissions that allow the instructor to view or edit materials associated with the course and a student has permissions that allow the student to view materials associated with the course.

40. A computer-implemented method for creating a first domain, the method comprising:
   analyzing data associated with a plurality of entities;
   establishing the first domain for selected ones of the plurality of entities; and
   storing data associated with the first domain.

41. The method of claim 40, wherein at least one of the selected entities is a course and the data associated with the first domain provides metadata for the course, users associated with the course, and role data specifying a role of each of the users in the course.

42. The method of claim 40, wherein the entities comprise a plurality of courses or activities.

43. The method of claim 40, further comprising:
   determining access rights of a user based on a role of the user in association with a course or the first domain.

44. The method of claim 40, further comprising:
   establishing a second domain for selected ones of the plurality of entities; and
   storing data associated with the second domain.

45. The method of claim 44, wherein the first domain includes at least one entity in common with the second domain.

46. The method of claim 40, wherein the entities comprise one or more of courses, users, activities, organizations, and programs.

47. A computerized system for automatically creating a domain during a system integration of educational software, the system comprising:
   a storage device; and
   a first server, the first server identifying a source identifier associated with at least one source educational course provided by a second server, automatically establishing the domain, the domain being identified by the source identifier and including metadata associated with the at least one source educational course, and storing the metadata in the storage device.

48. The system of claim 47, wherein the source identifier is identified by the first server and data associated with the at least one source educational course is stored on the second server and is accessible via the first server.

49. The system of claim 47, wherein the metadata for the at least one source educational course includes course data, user data for users associated with the at least one source educational course, and role data for each of the users in the context of the at least one source educational course.

50. The system of claim 49, wherein the role data provides access levels of the users associated with the at least one source educational course and the first server provides, based on the access levels, users of the first server with access to data stored in the first server or the second server.

51. The system of claim 50, wherein the metadata provides at least one of course data for the at least one source educational course, user data for users that are associated with the at least one source educational course, and role data for users that are associated with the at least one source educational course.

52. A computer-implemented method for providing an educational course, comprising:
    accessing metadata associated with the educational course, the metadata being stored in a first server;
    based on the metadata, identifying software providing functionality for the educational course, the software being stored in a second server; and
    providing access to the functionality for the educational course via the first server.

53. The method of claim 52, wherein providing access to the functionality for the educational course via the first server further comprises:
    determining whether a user of the first server has access rights to the educational course.

54. The method of claim 53, wherein determining whether the user has access rights further comprises:
    accessing metadata for a domain associated with the educational course; and
    based on the metadata for the domain, determining whether the user is associated with the educational course.

55. The method of claim 52, further comprising:
    storing data associated with the educational course in the first server.

56. The method of claim 55, wherein the data associated with the educational course is student-generated data.

57. The method of claim 55, wherein the data associated with the educational course is instructor-generated data.

58. The method of claim 52, further comprising:
    providing, via the first server, access to external resources.

59. The method of claim 55, further comprising:
    exporting the data to an external system.

60. The method of claim 55, further comprising:
    sharing the data on the first server with an evaluation system residing on the first server.

61. The method of claim 59, wherein the external system is an evaluation system that evaluates the data in support of an accreditation process of an institution.

62. The method of claim 59, wherein the external system is an evaluation system that evaluates the data in support of institutional planning or curriculum planning.

63. A computer-implemented method for providing an educational course, comprising:
    integrating the educational course to a first server from a second server, wherein metadata associated with the educational course is stored in the first server and software providing functionality for the educational course is stored in the second server;
    accessing the metadata stored in the first server; and
    enabling a user device to access the functionality for the educational course via the first server.

64. The method of claim 63, further comprising:
    storing data associated with the educational course in the first server.

65. The method of claim 64, further comprising:
    exporting the data to an external system.

66. The method of claim 64, further comprising:
    sharing the data on the first server with an evaluation system residing on the first server.

67. The method of claim 65, wherein the external system is an evaluation system that evaluates the data in support of an accreditation process of an institution associated with the first server.

68. The method of claim 65, wherein the external system is an evaluation system that evaluates the data in support of institutional planning or curriculum planning.

69. The method of claim 63, further comprising:
    establishing a domain for the educational course, wherein a student associated with the domain has access rights to the functionality provided by the educational course.

70. The method of claim 64, wherein the data includes grades for students associated with the educational course.

71. A computerized system for providing an educational course, comprising:
    a storage device; and
    a first server, the first server accessing metadata stored in the storage device and associated with the educational course, the first server identifying software providing functionality for the educational course, the software being stored in a second server, and the first server providing access to the functionality for the educational course via the first server.

72. The system of claim 71, wherein the storage device is coupled to or included in the first server.

73. The system of claim 71, wherein the first server provides access to the functionality for the educational course by determining whether a user of the first server has access rights to the educational course.

74. The system of claim 71, wherein the first server determines whether the user has access rights by accessing metadata for a domain associated with the educational course and, based on the metadata for the domain, determines whether the user is associated with the educational course.

75. The system of claim 71, wherein the first server stores data associated with the educational course.

76. The system of claim 75, wherein the first server exports the data to an external system.

77. The system of claim 76, wherein the external system is an evaluation system that evaluates the data to determine accreditation of an institution associated with the first server.

78. The system of claim 76, wherein the external system is an evaluation system that evaluates the data to determine whether an institution associated with the first server is meeting goals.

* * * * *